(No Model.)
R. HERMAN.
PIPE COUPLING.
No. 502,038. Patented July 25, 1893.
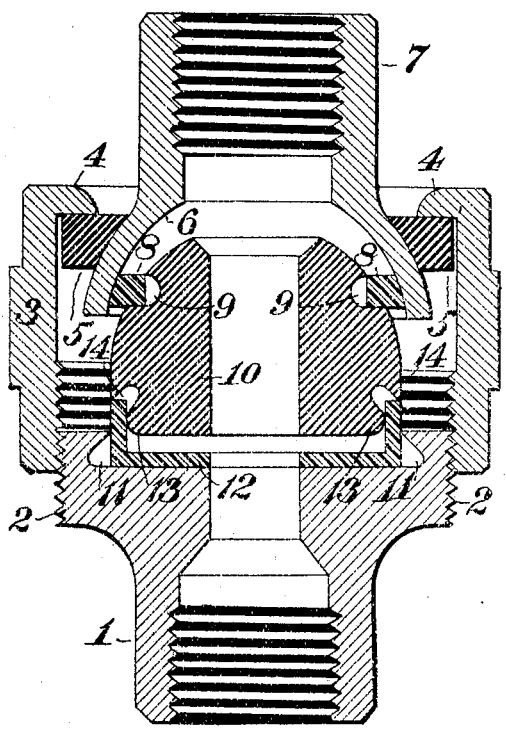
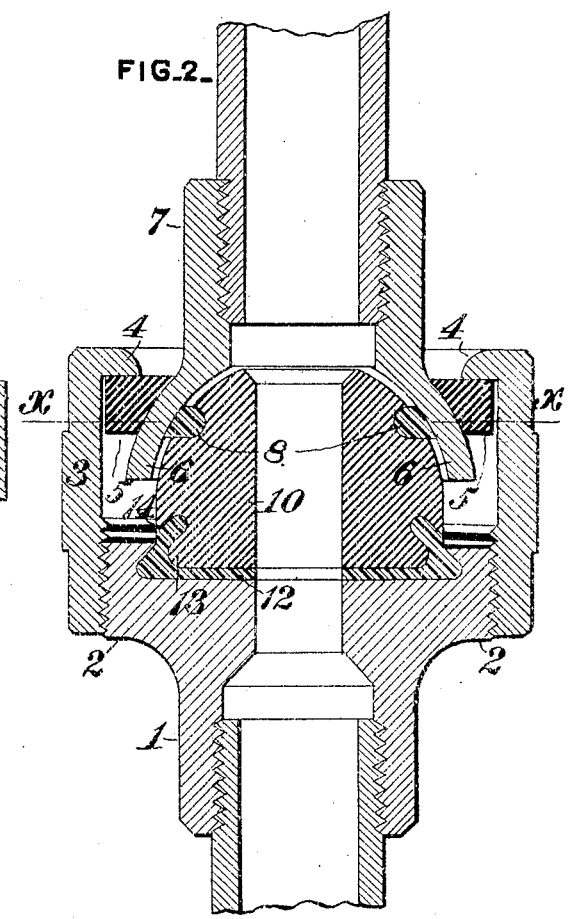
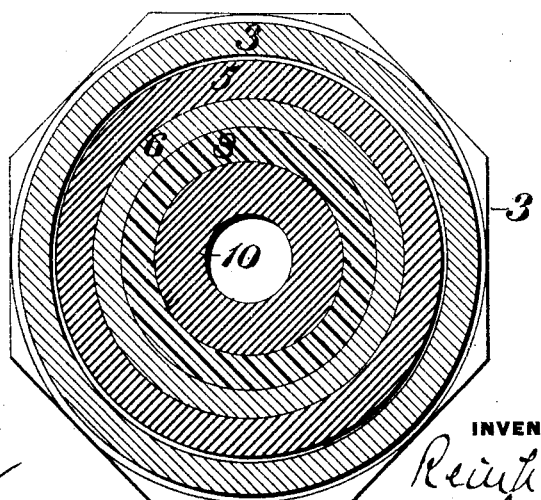
WITNESSES:
C. M. Clarke
F. E. Gaither
INVENTOR,
Reinhold Herman
by George H. Christy
Att'y.

UNITED STATES PATENT OFFICE.

REINHOLD HERMAN, OF CRAFTON, PENNSYLVANIA.

PIPE-COUPLING.

SPECIFICATION forming part of Letters Patent No. 502,038, dated July 25, 1893.

Application filed May 2, 1893. Serial No. 472,697. (No model.)

*To all whom it may concern:*

Be it known that I, REINHOLD HERMAN, a citizen of the United States, residing at Crafton, in the county of Allegheny and State of Pennsylvania, have invented or discovered certain new and useful Improvements in Pipe-Couplings, of which improvements the following is a specification.

The invention described herein relates to certain improvements in pipe couplings with particular reference to their employment in connection with combined gas and electric light fixtures.

The invention has for its object an insulated coupling for connecting combined gas and electric light fixtures to the service pipes of houses, &c., so constructed that the fixture may be readily and accurately hung, regardless of any angularity of the end of the pipe projecting from the ceiling or wall.

In general terms, the invention consists in the construction and combination, substantially as hereinafter described and claimed.

In the accompanying drawings forming a part of this specification, Figure 1 is a sectional view of the parts of my coupler assembled together. Fig. 2 is a similar view showing the parts when secured together ready for use; and Fig. 3 is a sectional plan view, the plane of section being indicated by the line x, x, Fig. 2.

In the practice of my invention, the internally threaded socket 1 is provided with a head or enlargement 2 externally threaded for engagement with the internally threaded sleeve 3. This sleeve is provided with an inwardly projecting flange 4, adapted to bear upon the annular disk, formed of insulating material and having the wall of the opening therethrough shaped to fit closely upon the outer face of the concavo-convex bowl 6 of the socket 7. The inner concave wall of the bowl 6 has a bearing upon the packing ring 8 held within a peripheral groove 9 in the block 10, formed of insulating material, such as porcelain, vulcanized fiber or other suitable material. This block preferably has a convex upper end, so as to permit of an angular adjustment of the socket 7, with relation to the other parts of the coupling, and is held within a recess 11 in the head or enlargement 2, by a soft metal packing 12 or other suitable means, as plaster of paris or other suitable cement. It will be observed that the walls of the recess 11 are undercut, and that the lower end of the block is provided with a dovetail projection 13, constructed to fit within the dish-shaped packing 12, which in turn fits within the recess 11.

In assembling the parts, the dish-shaped packing is first placed within the recess 11. The block 10 is then placed as shown in Fig. 1 with the shoulder 14 resting upon the edge of the packing. The packing ring 8, which is preferably formed of soft metal or other suitable plastic material, is then placed in position, and the bowl with the disk thereon, is next arranged over the block, as shown in Fig. 1. Finally the sleeve 3 is adjusted in position and screwed onto the head or enlargement 2, thereby forcing the projection 13 into the recess 11 and causing the rim of the packing 12 to flow into the undercut portions of the recess and also into the groove at the junction of the projection 13, and the block 10 with the effect of tightly locking the block to the head or enlargement. The inward movement of the bowl as the sleeve is screwed home, also forces the packing ring 8 into the groove 9, and so shapes the outer face of said ring that it will form a tight joint with the bowl. It will be readily understood that plaster of paris or other cement may be placed in the recess 11, and be caused to flow into the groove in the block and the undercut part of the recess, by forcing the projection on the block into the recess. And also the packing or bearing ring 8 may be cast or otherwise fitted into the groove 9, or may be formed integral with the block. As the block 10 and the annular disk 5 are formed of insulating material, the two sockets 1 and 7 are completely insulated from each other. The concavo-convex bowl and convex block permit of the sockets 1 and 7 being shifted to a considerable angle to each other, so that if the end of a service pipe projects at an angle other than a right angle from a wall or ceiling, a fixture connected to such end by my improved coupling, can be easily shifted so as to be in proper relation to wall or ceiling.

For electric light fixtures the block 10 may be made solid, but when used for gas or gas and electric fixtures, an opening is formed through the block, as shown. If a non-conducting material be employed for securing the block 10 on the socket head 2, the block need not be formed of insulating material as the cement will insulate the block from the socket head.

I claim herein as my invention—

1. In a pipe coupling, the combination of two internally threaded sockets, one of the sockets being provided with an externally threaded head or enlargement and the other with a concavo-convex bowl, a hollow bearing block detachably connected to one of said sockets and provided with a packing ring, an annular disk fitting over the bowl of the other socket and an internally threaded sleeve provided with an inwardly projecting flange for engagement with the annular disk and adapted to screw onto the externally threaded socket, substantially as set forth.

2. In a pipe coupling, the combination of two internally threaded sockets, one of the sockets being provided with an externally threaded head or enlargement, and the other with a concavo-convex bowl, a bearing block formed of insulating material attached to one of the sockets and provided with a packing ring, an annular disk formed of insulating material and fitting over the bowl of the other socket, and an internally threaded sleeve provided with a flange for engagement with the annular disk and adapted to screw onto the externally threaded socket, substantially as set forth.

In testimony whereof I have hereunto set my hand.

REINHOLD HERMAN.

Witnesses:
DARWIN S. WOLCOTT,
E. J. SMAIL.